US012278664B1

(12) United States Patent
Mclinden et al.

(10) Patent No.: US 12,278,664 B1
(45) Date of Patent: *Apr. 15, 2025

(54) AERIAL NETWORKS WITH HYBRID COMMUNICATION LINKS

(71) Applicant: Architecture Technology Corporation, Eden Prairie, MN (US)

(72) Inventors: Ian Mclinden, Eden Prairie, MN (US); Jordan Bonney, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,689

(22) Filed: Nov. 14, 2022

Related U.S. Application Data

(63) Continuation of application No. 17/587,859, filed on Jan. 28, 2022, now Pat. No. 11,563,488, which is a
(Continued)

(51) Int. Cl.
*H04B 10/114* (2013.01)
*H04B 10/516* (2013.01)
(Continued)

(52) U.S. Cl.
CPC ....... *H04B 10/1143* (2013.01); *H04B 10/516* (2013.01); *H04B 10/66* (2013.01); *H04L 1/0061* (2013.01)

(58) Field of Classification Search
CPC .. H04B 10/1143; H04B 10/516; H04B 10/66; H04L 1/0061
(Continued)

(56) References Cited

U.S. PATENT DOCUMENTS 6,771,932 B2 * 8/2004 Caminiti ............... H04W 16/18
455/67.14
7,453,835 B1 * 11/2008 Coty ..................... H04W 92/02
398/115
(Continued)

FOREIGN PATENT DOCUMENTS

CN      108764653        11/2018
CN      108764653 A   *  11/2018   ....... G06Q 10/06312
(Continued)

OTHER PUBLICATIONS

Ali et al; Hybrid Channel Codes for Efficient FSO/RF Communication Systems; Oct. 2010, IEEE; pp. 1-13. (Year: 2010).*
(Continued)

*Primary Examiner* — Amritbir K Sandhu
(74) *Attorney, Agent, or Firm* — Foley & Lardner LLP

(57) ABSTRACT

Disclosed herein are embodiments of an aerial network system including a first transceiver configured to transmit and receive free space optical (FSO) signals and a second transceiver configured to transmit and receive radio frequency (RF) signals. A processor provides modulated data signals to the first and second transceivers for transmission and receives demodulated signals from the first and second transceiver. The processor is configured for policy-based multipath admission of requests for access to an IP-routing enabled overlay network. The processor includes an inverse mission planning system configured for predictive traffic load balancing of transmitted FSO signals and RF signals. The inverse mission planning system includes radio behavior models and aerial platform models, and is configured for geographic simulation and optimization of mission planning data based upon user-inputted mission-specific data. Forward error correction (FEC) coding of transmitted commu-
(Continued)

nications via packet erasure coding provides resiliency with a low bit error rate.

20 Claims, 5 Drawing Sheets

Related U.S. Application Data continuation of application No. 16/749,779, filed on Jan. 22, 2020, now Pat. No. 11,277,203.

(51) Int. Cl.
*H04B 10/66* (2013.01)
*H04L 1/00* (2006.01)

(58) Field of Classification Search
USPC .......................................................... 398/130
See application file for complete search history.

(56) References Cited

U.S. PATENT DOCUMENTS

| | | | |
|---|---|---|---|
| 7,920,071 B2 | 4/2011 | Baillot | |
| 10,068,493 B2 | 9/2018 | Brueckner et al. | |
| 10,083,624 B2 | 9/2018 | Brueckner et al. | |
| 10,181,895 B2 * | 1/2019 | Liu | H04B 7/1851 |
| 10,346,612 B1 | 7/2019 | Donovan et al. | |
| 11,277,203 B1 * | 3/2022 | McLinden | H04B 10/66 |
| 11,563,488 B1 * | 1/2023 | McLinden | H04B 10/66 |
| 2004/0037566 A1 * | 2/2004 | Willebrand | H04B 10/114 |
| | | | 398/115 |
| 2012/0214147 A1 | 8/2012 | Ernst et al. | |
| 2012/0308235 A1 | 12/2012 | Pusarla et al. | |
| 2014/0274225 A1 * | 9/2014 | Lacatus | H04W 52/0261 |
| | | | 455/574 |
| 2015/0050623 A1 | 2/2015 | Falash et al. | |
| 2015/0249498 A1 * | 9/2015 | Minguez Rascon | B64D 39/00 |
| | | | 398/115 |
| 2015/0257081 A1 | 9/2015 | Ramanujan et al. | |
| 2017/0171703 A1 | 6/2017 | Maheswaranathan | |
| 2018/0091939 A1 | 3/2018 | Venkatraman et al. | |
| 2018/0269972 A1 * | 9/2018 | Djordjevic | H04B 10/25752 |
| 2019/0261262 A1 * | 8/2019 | Stiles | H04W 72/54 |
| 2019/0274225 A1 | 9/2019 | Takahashi | |
| 2019/0364459 A1 | 11/2019 | Lee | |
| 2020/0169323 A1 * | 5/2020 | Moro | H04B 10/118 |
| 2020/0177503 A1 * | 6/2020 | Hooda | H04L 12/66 |
| 2020/0201316 A1 | 6/2020 | Schupke et al. | |

FOREIGN PATENT DOCUMENTS

| | | | |
|---|---|---|---|
| WO | WO-00/04478 A2 | 1/2000 | |
| WO | WO-2007/033237 | 3/2007 | |
| WO | WO-2007033237 A2 * | 3/2007 | ............. H04L 45/00 |

OTHER PUBLICATIONS

Huang et al; A new dynamic path planning approach for unmanned Aerial vehicles; Nov. 2018; Wiley Hindawi; pp. 1-18. (Year: 2018).*

Zhao et al; Resource Allocation for Hybrid RF/FSO Multi-Channel Multi-Radio Wireless Mesh Networks ; Jan. 2020; IEEE Access; pp. 1-13. (Year: 2020).*

Yu et al; Real-time trajectory planning for UCAV air-to-surface attack using inverse dynamics optimization method and receding horizon control; 2013; Chinese Journal of Aeronautics; pp. 1-19. (Year: 2013).*

Susana et al; Prediction of Satellite Shadowing in Smart Cities with Application to IoT; Jan. 14, 2020; MDPI; pp. 1-19. (Year: 2020).*

B. Trent et al., "Dynamics: Inverse mission planning for dedicated aerial communications platforms," MILCOM J015—2015 IEEE Military Communications Conference, Oct. 26-28, 2015.

Brueckner et. al., (Air Force Research Laboratory); "Automated Computer Forensics Training in a Virtualized Environment", Digital Forensic Research Conference, DFRWS 2008 USA, Aug. 11-13, 2008; 8 pages.

Chief of Staff, United States Air Force; "Enhancing Multi-domain Command and Control . . . Tying It All Together," https://www.af.mil/Portals/1/documents/csaf/letter3/Enhancing_Multi-domain_CommandControl.pdf, Sep. 18, 2018; 3 pages.

Information Disclosure Statement filed Jan. 22, 2020.

Malik et al; Free Space Optics: Current Applications and Future Challenges; Sep. 2015; Hindawi Publishing Corporation ; pp. 1-8. (Year: 2015).

Nadeem et al., "Implementation and analysis of load balancing switch over for hybrid wireless network," IEEE, 2009, 6 pages.

Non-Final Office Action on U.S. Appl. No. 17/587,859 Dtd Aug. 23, 2022.

Notice of Allowance on U.S. Appl. No. 17/587,859 Dtd Sep. 26, 2022.

Notice of Allowance on U.S. Appl. No. 16/749,779 dated Nov. 3, 2021 (12 pages).

Press Release, Corporate Headquarters, Architecture Technology Corporation; "CYRIN—Virtual Advanced Cyber Training Now With Three Levels of Training Designed for the Utility Industry", https://www.pressrelease.com/files/fb/0f/548a5a42ceeed67a8ace4e5123d2.pdf; Jun. 6, 2019; 10 pages.

Reynolds, "Multi-domain command and control is coming," Headquarters Air Force Strategic Integration Group, https://www.af.mil/News/Article-Display/Article/1644543/multi-domain-command-and-control-is-coming/, Sep. 25, 2018; 3 pages.

Sagduyu et al., "Optimal Transmission Decisions for Airborne Relay Communications," Waveforms and Signal Processing, IEEE, 2015, pp. 1685-1690.

T&D World, "ATCorp Announces Virtual, Online Cyber Security Training for the Utility Industry", https://www.tdworld.com/safety-and-training/article/20972718/atcorp-announces-virtual-online-cyber-security-training-for-the-utility-industry, Jun. 19, 2019, (4 pages).

U.S. Office Action on U.S. Appl. No. 16/749,779 dated Aug. 9, 2021 (37 pages).

U.S. Office Action on U.S. Appl. No. 16/749,779 dated May 12, 2021 (32 pages).

Wong et. al., "Next-Generation Wargaming for the U.S. Marine Corps", Rand Corporation, Nov. 30, 2019; (253 pages).

* cited by examiner

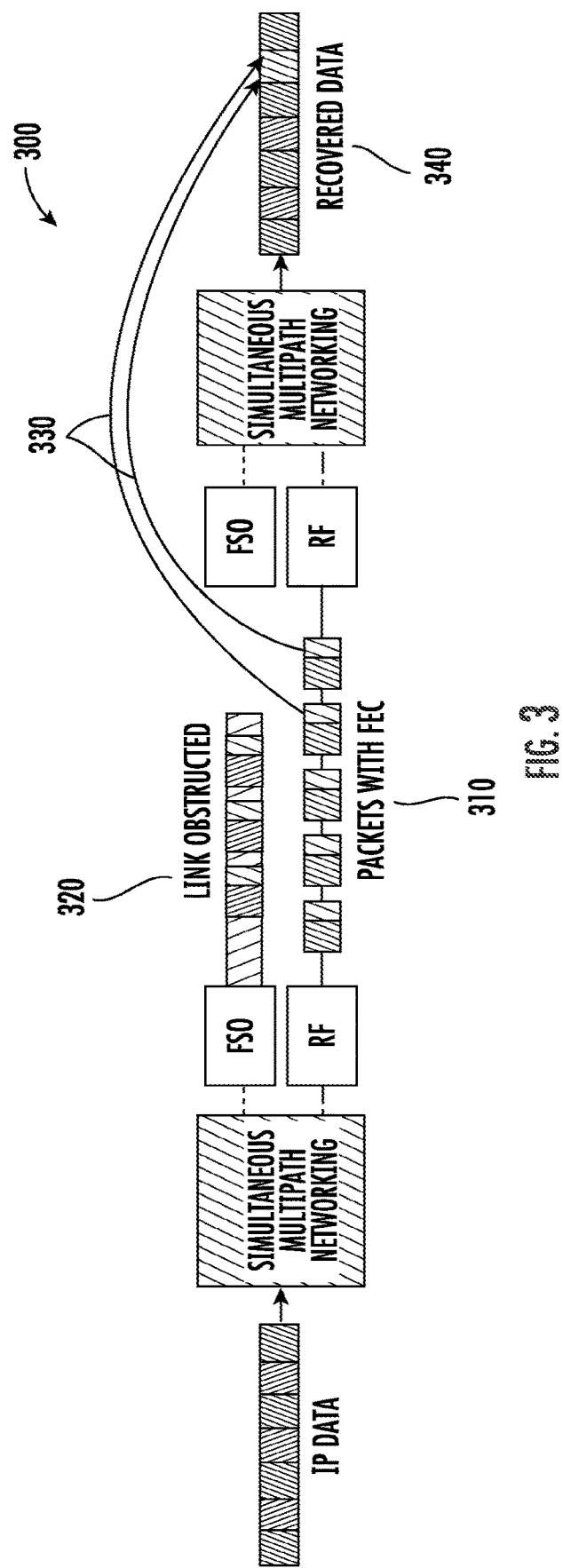

AERIAL NETWORKS WITH HYBRID COMMUNICATION LINKS

CROSS-REFERENCE TO RELATED APPLICATIONS

This application is a continuation of U.S. patent application Ser. No. 17/587,859, filed Jan. 28, 2022, titled "AERIAL NETWORKS WITH HYBRID COMMUNICATION LINKS," which is a continuation of U.S. patent application Ser. No. 16/749,779, filed Jan. 22, 2020, titled "HYBRID COMMUNICATIONS BASED ON AERIAL NETWORKS," which are incorporated by reference in their entireties.

TECHNICAL FIELD

This application relates generally to the field of aerial networks, and more specifically to systems and methods for aerial networks utilizing hybrid communication links including Free Space Optical (FSO) communications.

BACKGROUND

In conventional Internet Protocol (IP) networks, communication infrastructures often comprise computing resources that are immobile and placed at a set of fixed locations. However, tactical communications, i.e., military communications in which information is conveyed from one command, person, or place to another upon a battlefield, often entail more demanding communication requirements in IP networking. Communications initiatives such as the Joint Aerial Layer Network (JALN) conglomeration of programs include requirements to provide data in the air, on the ground and at sea, even under the most harsh conditions. In JALN aerial layered networks, airborne assets must be capable of providing IP communications to warfighters while operating in austere and remote environments.

Generally, aerial layered networks incorporate various wireless communication technologies, such as radio frequency (RF) technologies and free-space optical (FSO) communications. Current JALN systems utilizing FSO communications in combination with one or more RF links are typically limited to using either FSO or RF at a given time, not in combination. Despite advances in the state of the art in high-throughput FSO communications systems, FSO communications are vulnerable to intermittent connectivity problems and error sensitivity. By their nature, FSO systems are susceptive to environmental degradation including total link loss. These problems have limited widespread adoption of FSO in aerial networking.

Aerial networks typically incorporate modems, hardware devices that convert data into a format suitable for a transmission medium. Conventional modem hardware can be limited by mode of transmission. Such conventional systems allow connectivity to only one transmission hardware stack at a time, such as FSO, RF, or wired. Routing systems combine multiple hardware-level adapters on a platform, but conventional routing systems do not inherently enable the simultaneous use of multiple communication chains including FSO.

SUMMARY

What is therefore desired are communications techniques that inherently enable the simultaneous use of multiple communication chains including FSO communications.

In conventional tactical networking, multiple information flows between IP enclaves are aggregated into a single encrypted flow, rendering the information flows indistinguishable. Quality of service (QOS) signaling mechanisms used in conventional tactical networking such as bandwidth reservation are encrypted before entry into the core network, thereby preventing granular data admission control. Conventional tactical networking systems may be capable of multiple-link failover protection. However, such systems generally require a network failure to occur before corrective measures can be taken.

Embodiments disclosed herein solve the aforementioned technological problems and/or other technological problems. The systems and methods of the disclosure are capable of independently routing multiple information flows between IP enclaves. The disclosed systems and methods redistribute traffic for optimal link utilization in systems with transient link operation such as multiple-path links containing FSO communications, even under the most harsh conditions.

The disclosed systems and methods incorporate routing techniques that address susceptibility of FSO systems to environmental degradation, including total link loss due to obstruction. Embodiments described herein provide granular data admission control such as QoS signaling in tactical networking. Multiple-path links including one or more FSO link provide failover protection in tactical networking to eliminate or reduce data loss due to spurious loss of an FSO link.

An aerial network includes a plurality of aerial communications platforms located within a mission geographic area. Each of the plurality of aerial communications platforms includes an overlay network communication system. The communication system includes an FSO transmitter configured to transmit and direct optical signals through free space, and an FSO receiver configured to receive free space optical signals. The communication system also includes a second transmitter configured to transmit and direct radiated electromagnetic signals, and a second receiver configured to receive electromagnetic signals.

Each of the plurality of aerial communications platforms includes a processor configured to modulate data signals and provide modulated data signals to the FSO transmitter and to the second transmitter for transmission, and configured to demodulate the received free space optical signals and to demodulate the received electromagnetic signals. In an embodiment, the processor is configured for policy-based multipath admission capable of simultaneous transmission of the FSO signals and the electromagnetic signals. In an embodiment, the processor is further configured for predictive traffic load balancing of one or both transmitted FSO signals and transmitted electromagnetic signals.

In various embodiments, the processor of each of the plurality of aerial communications platforms is further configured to effect forward error correction (FEC) coding of one or both of the transmitted FSO signals and transmitted electromagnetic signals. In an embodiment, the FEC coding comprises packet erasure coding.

In an embodiment, the aerial network includes a first point-to-point connection and a second point-to-point connection communicatively coupling the plurality of aerial communications platforms. In an embodiment, the plurality of aerial communications platforms are IP-routing enabled nodes in an overlay network.

In various embodiments, each of the plurality of aerial communications platforms further includes an inverse mission planning system configured for predictive traffic load balancing of one or both of the transmitted FSO signals and the transmitted electromagnetic signals. In an embodiment, the inverse mission planning system includes radio behavior models and aerial platform models. In various embodiments, the inverse mission planning system is configured for geographic simulation and optimization of mission planning data based upon user-inputted mission-specific data. In an embodiment, the inverse mission planning system outputs a pre-planned mission plan file comprising predictive traffic load balancing data based upon the user-inputted mission-specific data. In an embodiment, the inverse mission planning system is configured to output a re-planned mission plan file based on changes within the mission geographic area during a mission.

In an embodiment, the plurality of aerial communication platforms include one or more of an aircraft, an unmanned aerial vehicle (UAV), a ground station, and a ship-borne platform. In an embodiment, the plurality of aerial communication platforms include an aircraft following a pre-planned flight path within the mission geographic area.

In an embodiment, an aerial network comprises a plurality of aerial communications platforms located within a mission geographic area; wherein each of the plurality of aerial communications platforms includes an overlay network communication system comprising an FSO transmitter configured to transmit and direct optical signals through free space; an FSO receiver configured to receive free space optical signals; a second transmitter configured to transmit electromagnetic signals, the second transmitter configured to direct radiated electromagnetic signals; a second receiver configured to receive electromagnetic signals; and a processor configured to modulate data signals and provide modulated data signals to the FSO transmitter and to the second transmitter for transmission; and configured to demodulate the received free space optical signals and to demodulate the received electromagnetic signals; wherein the processor is further configured for policy-based multipath admission capable of simultaneous transmission of the FSO signals and the electromagnetic signals; wherein the processor is further configured for predictive traffic load balancing of one or both transmitted FSO signals and transmitted electromagnetic signals.

In an embodiment, an aerial network comprises a first transceiver configured to transmit and receive a first transceiver configured to transmit and receive FSO signals via an optics assembly; a second transceiver configured to transmit and receive electromagnetic signals in a radio frequency (RF) signals via an antenna; a processor configured to provide modulated data signals to the first and second transceivers for transmission and to receive demodulated signals from the first and second transceivers; wherein the processor is further configured for policy-based multipath admission of requests for access to an IP-routing enabled overlay network; wherein the aerial network system is capable of simultaneous transmission of the FSO signals and the electromagnetic signals and the processor is further configured for predictive traffic load balancing of transmitted FSO signals and transmitted RF signals.

BRIEF DESCRIPTION OF THE DRAWINGS

The accompanying drawings constitute a part of this specification and illustrate embodiments of the subject matter disclosed herein.

FIG. 3 illustrates packet erasure coding FEC coding of a system for RF and FSO communications between IP enclaves, according to an exemplary embodiment.

DETAILED DESCRIPTION

Figure 1:
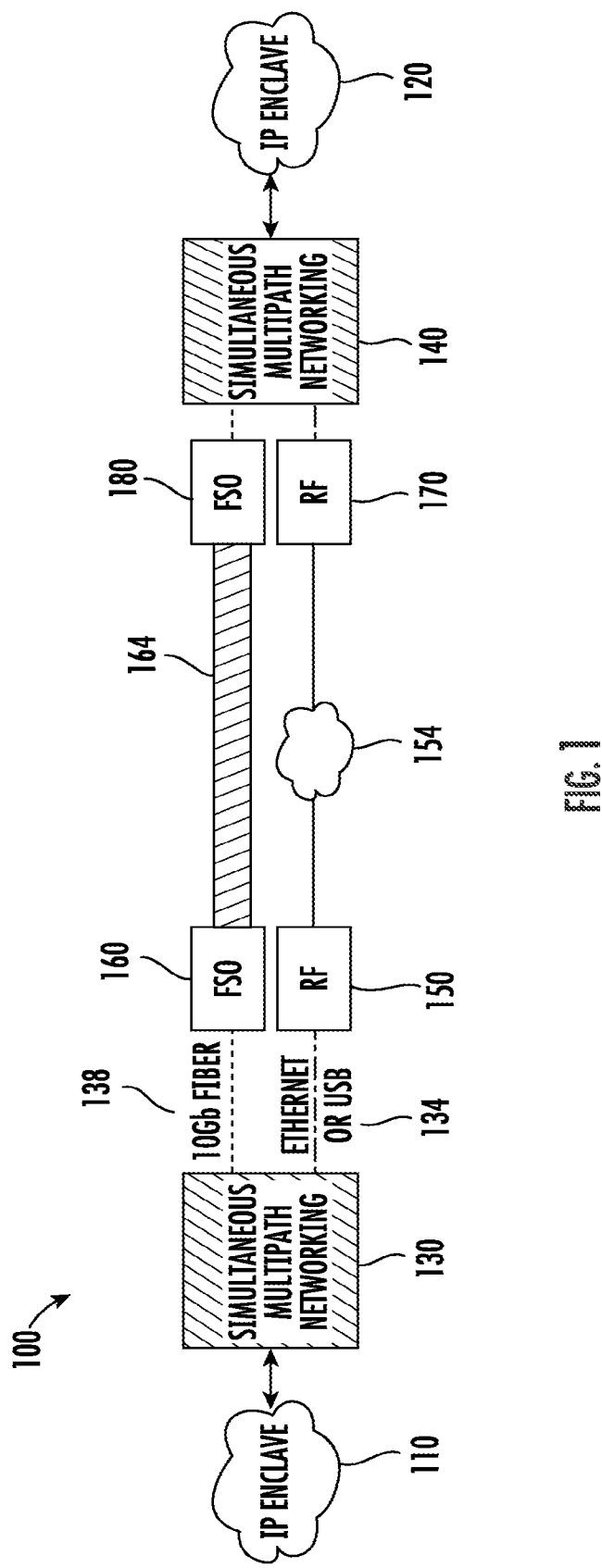
FIG. 1 illustrates a system for RF and FSO communications between IP enclaves, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein.

Systems and methods disclosed herein employ a hybrid hardware/software solution capable of simultaneous utilization of FSO and RF links.

Wireless data transmission is a proven technique for transferring information between two points that are not connected by an electrical conductor or optical fiber. While modern communication networks make broad use of fiber optic cables, coaxial cables, and other wired transmission media, wireless communication links are an important part of many networks.

Radio Frequency (RF) wireless links are often found at the edge of communication networks, connecting devices such as cell phones, computers, printers, automobiles, machinery, and many other devices. Those wireless connections tend to operate at relatively low data rates, measured in megabits per second (Mbps). RF wireless links are often used in terrestrial communication networks when wired links, such as those using fiber optic cables and/or coaxial copper cables, are unfeasible (due to geography, lack of right-of-way, or other barriers), too expensive, too risky, or too slow. Wireless links such as RF are also used in airborne communication networks, connecting airborne platforms such as fixed wing airplanes, helicopters, and other airborne platforms to the ground and to each other. Similarly, wireless links are used for communication to, from and between satellites. Given the nature of airborne and satellite communication networks, wired links are not an option.

FSO communication is an alternative to RF wireless communication. Instead of transmitting the data via radio frequency electromagnetic waves, FSO communication transmits the data via light, by modulating the output of a laser at the transmitter and detecting the modulated signal at the receiver. FSO communication is similar to fiber optic communication. Instead of sending the modulated light through an optical cable, the signal is sent through the air, free-space. FSO involves transmission of low-powered multi-wavelength laser beams through the atmosphere, sending optical signals through the air using lenses and mirrors to focus and redirect the beams. An FSO system can operate at different wavelengths, including 850 nanometers (nm), 980 nm, within the 1300 nm region (1280 nm to 1310 nm), and within the 1550 nm region (1530 nm to 1565 nm). FSO signals with wavelengths at or around 1550 nm can tolerate poorer visibility than signals with wavelengths at or around 850 nm.

FSO communication has various advantages when compared to RF wireless communication. The FSO signal is less sensitive to rain. FSO transmission does not require a license, and the narrow FSO signal is difficult to intercept. Each optical channel, created by modulating an optical signal with a specific wavelength, can carry 10 Gbps of data or more. Multiple optical channels, each a separate optical signal with a unique wavelength, can be combined in an FSO link to deliver even higher data rates.

FSO links have certain limitations when compared to RF wireless communication. While FSO supports extremely high data rates, it is a line-of-sight (LoS) technology. Therefore, obstructions and atmospheric conditions such as fog, rain, heavy snow, other airborne particulates, and low clouds can hinder or bring down FSO transmissions. Another atmospheric condition affecting FSO communication is scintillation, variation in refractive index of air generally due to change in temperature. Moreover, the range of FSO signals is limited as compared to radio frequency (RF) technologies. FSO links tend to be limited in distance to less than 1 km. In order to span longer distances, multiple individual links must be combined into a single multi-hop link, with repeaters at the intermediate node. Further, the fact that FSO is generally a point-to-point (PtP) technology, coupled with its LoS characteristics, has traditionally made it difficult to use with mobile transceivers.

FSO systems are highly susceptible to environmental degradation, including total link loss due to obstruction. Though FSO systems offer theoretical throughputs that are orders of magnitude greater than some RF systems, they do not provide predictable link degradation, instead failing completely and often unexpectedly. When linked, these systems are highly sensitive to environmental conditions causing bit errors, leading to significant IP-stack overhead in error correction, and reduced TCP performance.

Conventional modem hardware is primarily limited by mode of transmission. Existing systems allow connectivity to only one transmission hardware stack at a time, be it FSO, RF, or wired. Routing solutions exist to combine multiple hardware-level adapters on a platform, but they do not inherently enable the simultaneous use of multiple communication chains. Some systems offer multiple-path routing with features such as load balancing. The unique routing environments for RF and FSO communications limit the effectiveness of available solutions. As environmental factors affect the performance characteristics of RF and FSO equipment, the routing costs may change dramatically across available network paths.

Some conventional systems provide load balancing suitable for multiple cost paths, for example via unequal-cost-path load balancing. However, such systems only proportionately distribute traffic according to path metrics. These conventional multiple-path routing techniques lack the capability to redistribute traffic for optimal link utilization, a key capability in systems with transient link operation, such as multiple-path links including FSO.

In conventional tactical networking, multiple information flows between IP enclaves are aggregated into a single encrypted flow. This renders the information flows indistinguishable, and unable to be independently routed. Consequently, network rebalancing in the core network is not possible even if the existing network framework is capable. Furthermore, QoS signaling mechanisms, enabling bandwidth reservation for example, are encrypted before entry into the core network. As such, such systems cannot achieve granular data admission control.

Certain conventional JALN systems are capable of multiple-link failover protection. However, such systems can incur delay in failure condition detection, link and network rebalancing, error recovery, and hysteresis. These systems require a network failure to occur before corrective measures can be taken.

SURFER utilizes overlay network techniques of policy routing and multipath admission to enable simultaneous use of two or more IP-enabled links, regardless of their physical transmission mode. Additionally, by leveraging predictive mission planning and packet erasure coding, SURFER pre-emptively load balances network traffic to best utilize available bandwidth, and prevent congestion and packet loss upon unexpected link disconnection.

Table 1 identifies system requirements, and technical features of SURFER that address those requirements.

TABLE 1

System requirements and SURFER techniques to address these requirements

| Requirements | Techniques |
| --- | --- |
| Simultaneous utilization of mixed-mode communication systems such as FSO or RF | Policy-based multipath admission, automatic network rebalancing |
| High speed, capable of up to 10 Gbps throughput on IP-enabled links | Kernel-based IP routing to avoid modulation/demodulation overhead |
| Resilient, with a low bit error rate (BER) | Predictive traffic load balancing, packet erasure coding |

Overlay network techniques decouple network services from the underlying infrastructure by encapsulating one packet inside of another packet.

Policy routing, also here in called policy-based routing (PBR), is a technique for routing decisions based on policies set by the network administrator. Conventionally, when a router receives a packet it decides where to forward it based on the destination address in the packet, which is then used to look up an entry in a routing table. In policy routing as used in SURFER, the policies can forward the packet based on other criteria, such as basing forwarding on the source address rather than the destination address.

Admission control is a validation process in communication systems in which a check is performed before a connection is established to see if current resources are sufficient for the proposed connection. In general, admission control has the task to admit or reject a service request based on the available resources at the time of the service request and the resources that are needed to ensure proper quality for the particular service. Where dedicated resources such as bandwidth requirements may be needed, admission control can verify availability of such resources before a request can be admitted. SURFER uses admission control in combination with multipath routing schemes (herein sometimes called multipath admission control, or MPAC) to check among multiple paths available in the network before a connection is established to a given path to forward the traffic. SURFER's multipath admission control techniques consider whole-network paths in metrics calculations, providing redundancy for links without necessitating each link use two or more wireless connections. By intelligently load balancing all of these available paths, SURFER is able to significantly increase overall network efficiency by increasing the per-modem utilization.

SURFER uses techniques for preemptive load balancing of network traffic to best utilize available bandwidth. These techniques include predictive mission planning, including preemptive planning. SURFER's predictive network rebalancing based on geospatial analysis reduces network congestion during link failover procedures, and significantly reduces failover time. Alternatively, mission plans could be updated to eliminate environmental obstruction to RF and FSO systems.

SURFER includes forward error correction (FEC) techniques to prevent congestion and packet loss upon unexpected link disconnection. These techniques recognize that unlike radio frequency (RF) links, FSO is more sensitive to environmental factors such as transmission medium clarity due to foreign particulate or weather conditions. The FSO technology does not exhibit the same gradual degradation in signal and link quality shown by RF links. Instead, FSO links disconnect entirely, or almost entirely, without degradation. This quality makes FSO links uniquely susceptible to unpredictable bursts of bit error. By utilizing more degradation-prone RF links to provide FEC for the FSO link, and deploying FEC techniques that allow full-packet recovery, the network of the present disclosure can recover from spurious loss of the link without requiring pre-failure prediction.

In various embodiments, SURFER employs FEC techniques that allow full-packet recovery. In an embodiment, SURFER incorporates packet erasure coding, an FEC technique that permits a network to recover from spurious loss of a FSO link without requiring pre-error prediction. Packet erasure coding can be used for forward error correction in a packet erasure channel, a communication channel model in which sequential packets are either received or lost at a known location on such a channel. In an embodiment, SURFER's packet erasure coding techniques employ striping across multiple links, significantly reducing the chance of bit error and total data loss due to transient loss or environmental degradation of FSO and RF systems.

In various embodiments, FEC techniques stripe FEC data across multiple links. In exemplary embodiments of a two node topology in which the nodes were connected by three link abstractions A, B, and C, the FEC data for packets routed on link A could be added to packets on link B and C, allowing significant link degradation on link A before bit error or data loss occurs. Specific fault tolerance of the link varied with factors such as: (a) the number of links across which the FEC data is striped; (b) the bandwidth availability of the redundant links B and C in comparison to the data throughput on link A; (c) the FEC mechanisms used in encoding, including factors such as the amount of FEC data per data packet; (d) link latency of the redundant links B and C in comparison to data link A; and (e) recovery timeout thresholds for data on link A in comparison to latency on links B and C.

The FEC techniques may be applied at several layers in the OSI model, allowing flexibility of approach. For example, in a system of two nodes redundantly linked by fiber optic networking, the FEC techniques could be striped in-firmware at the OSI-2 (Data Link) layer. Alternatively, in aggregate network systems such as those common to aerial layered networks, the FEC techniques could be applied in routing software at the OSI-3 (Network) through OSI-5 (Application) to provide FEC across multiple abstract links, even when the hardware paths of the links are composed of multiple hardware chains, routing hops, or transmission technologies.

SURFER utilizes these various techniques to enable simultaneous use of two or more IP-enabled links, regardless of their physical transmission mode. By employing IP networking as the mode of modem integration, SURFER facilitates current and forward compatibility with the majority of available IP-enabled network appliances. SURFER's use of IP-enabled systems immediately allows integration of more than two wireless communication appliances, without re-architecture of the system. Additionally, this architecture allows immediate integration of third-party network peripherals such as end user devices or embedded computing platforms.

As shown in the schematic diagram of FIG. 1, SURFER-enabled RF and FSO communications system 100 incorporates SURFER platforms 130, 140 to enable RF and FSO communications between IP enclaves 110, 120. In various embodiments, SURFER platforms 130, 140 are computing packages for modem integration. In an embodiment, a SURFER package includes a dedicated hardware computing platform in combination with one or more dedicated IP-enabled wired or wireless modems for either or both wired and wireless communications, such as RF and FSO communications.

The SURFER-enabled RF and FSO communications system 100 may be hosted on one or more computers (or servers), and the one or more computers may include or be communicatively coupled to one or more databases including databases of a sponsoring entity and third party databases. The system 100 can be executed by a server, one or more server computers, authorized client computing devices, smartphones, desktop computers, laptop computers, tablet computers, PDAs and other types of processor-controlled devices that receive, process, and/or transmit digital data. The system 100 can be implemented using a single-processor system including one processor, or a multi-processor system including any number of suitable processors that may be employed to provide for parallel and/or sequential execution of one or more portions of the techniques described herein. The system 100 performs these operations as a result of central processing unit executing software instructions contained within a computer-readable medium, such as within memory. In one embodiment, the software instructions of the system are read into memory associated with the system 100 from another memory location, such as from a storage device, or from another computing device via communication interface. In this embodiment, the software instructions contained within memory instruct the system 100 to perform processes described below. Alternatively, hardwired circuitry may be used in place of, or in combination with, software instructions to implement the processes described herein. Thus, implementations described herein are not limited to any specific combinations of hardware circuitry and software.

Databases are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Database management systems include MySQL, PostgreSQL, SQLite, Microsoft SQL Server, Microsoft Access, Oracle, SAP, dBASE, FoxPro, IBM DB2, LibreOffice Base, FileMaker Pro. Database management systems also include NoSQL databases, i.e., non-relational or distributed databases that encompass various categories: key-value stores, document databases, wide-column databases, and graph databases. Databases of the SURFER-enabled RF and FSO communications system 100 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the system 100. A memory of the databases may be a non-volatile storage device for storing data and instructions, to be used by a processor of the system 100. In some embodiments, a memory of the databases may be a temporary memory, meaning that a primary purpose of the memory is not long-term storage.

In various embodiments, to enable the simultaneous use of RF and FSO systems, SURFER uses multipath admission routing to create overlay routes between interconnected network nodes. In an embodiment, the routing technology is based on ATCorp Routing and Encryption Suite (ARES), combined with platform-specific SURFER computational hardware. ATCorp Routing and Encryption Suite (ARES) is software for network management, crypto-aware network optimization, advanced QoS control supplied by Architecture Technology, Corporation Minneapolis, MN. (In the present disclosure, Architecture Technology Corporation is sometimes identified by its trade name, ATCorp). ARES is described at https://www.atcorp.com/products/err-1000/. ARES differs from conventional hybrid modem platforms in its ability to provide network-aware, dynamic routing over IP-enabled tactical radios such as those supporting SRW, ANW2, TTNT and MUOS waveforms.

In an embodiment, to address the bandwidth disparity between higher-capacity FSO systems and lower-capacity RF systems, SURFER employs ARES link sensing, QoS signaling for crypto-partitioned networks, and disaggregation of black-side flows (i.e., signals that carry cipher text). These techniques provide end-to-end flow admission control. By utilizing ARES cross-domain signaling, SURFER can provide in-system mechanisms for flow differentiation, allowing granular flow admission control, and thus optimizing network utilization.

Commonly assigned US Patent Publication US20150257081A1, incorporated by reference herein, discloses a hybrid router that provides end-to-end connectivity across a heterogeneous tactical network. The integration router is an autonomous IP based network integration solution configured to automatically connect with each of a plurality of heterogeneous subnetworks. The integration router provides persistent network connectivity between user nodes across the plurality of heterogeneous subnetworks. In an embodiment, the integration router dynamically configures a route selection between the first node on the one of the plurality of heterogeneous subnetworks and the second node on the another of the plurality of heterogeneous subnetworks based on a proactive failover based on degradation of service quality before route communication failure.

Conventional Air Force mission planning systems require that users manually enter flight paths. To address this limitation, ATCorp developed the DYNAMICS 3D modeling and optimization tool (DYNamic Airborne MIssion Communications System), an innovative framework for mission-aware pre-planning. DYNAMICS is a software system that can be stand-alone or integrated with existing mission planning systems. Rather than requiring end-users to enter courses, courses can be planned automatically based on where the other mission elements are positioned. This information, along with relative priorities and specifics about radios, allows for more effective planning of courses and placement in airspace of dedicated airborne relays. Key features of DYNAMICS include "inverse" course planning based on positions and communication capabilities of mission elements; continuous re-planning during the mission; prioritization of mission communication/connectivity requirements; and fully automatic and human-assisted operating modes. The DYNAMICS system is described at B. Trent et al., "DYNAMICS: Inverse mission planning for dedicated aerial communications platforms," MILCOM 2015-2015 IEEE Military Communications Conference, https://ieeexplore.ieee.org/document/7357536, 26-28 Oct. 2015.

In various embodiments, SURFER adapts ATCorp's DYNAMICS system to create a module for predictively rebalancing the network to reduce or prevent unexpected link loss, by redirecting flows prior to link deterioration or loss. By leveraging software models of vehicles, communications platforms, terrain, atmospheric, and other conditions, SURFER is able to construct a model of network connectivity over the life of a given mission. Unlike more computing-intensive computational models, SURFER efficiently calculates only regions that are likely to cause link deterioration or loss.

During operation, if mission elements approach a boundary determined likely to cause network outage, SURFER redirects traffic over alternative network paths, reducing or eliminating failover time at the time of an outage incident. Additionally, the SURFER models can be used to provide feedback data to flight planning software, such as geofenced regions of likely FSO and RF connectivity.

Figure 2A:
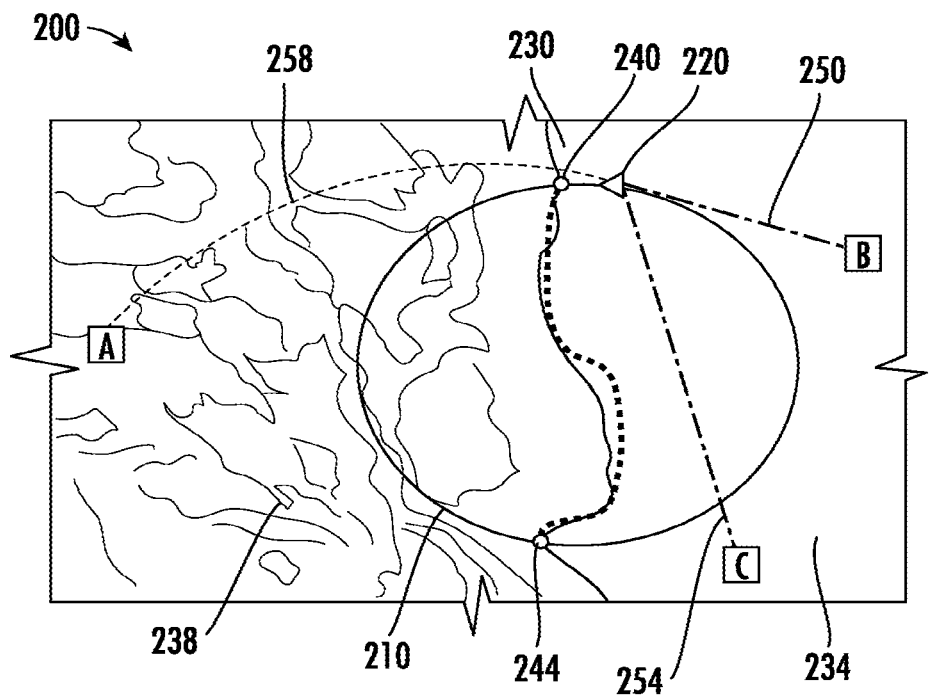
FIG. 2A is a map of a circular orbit flight plan in which an aircraft is over unobstructed terrain, showing a network of RF and FSO links, according to an exemplary embodiment.
Figure 2B:
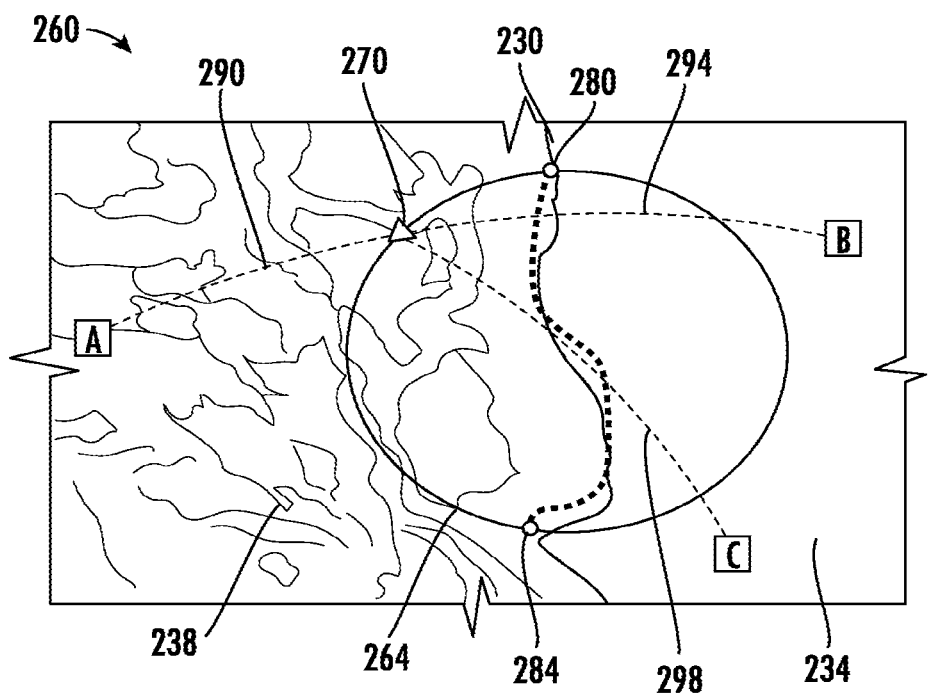
FIG. 2B is a map of a circular orbit flight plan in which an aircraft is over terrain obstructing line-of-sight communication, showing a network of RF links after the system has automatically rebalanced the network, according to an exemplary embodiment.

Maps 200, 260 of FIGS. 2A and 2B show a use example in which SURFER automatically rebalances a network in anticipation of optical link loss in an aircraft implementing a circular orbit flight plan. The circular orbit flight plan is shown at paths 210, 264, respectively, in maps 200, 260. An aircraft (triangle icons 220, 270) is networked with three ground-based stations A, B, and C. In an embodiment, the circular orbit flight plan 210, 264 defines a flight route area within a larger geographic mission area. While the aircraft 220 is over unobstructed terrain 234 (FIG. 2A), SURFER communicates with ground stations B and C via FSO communications 250, 254 and communicates with ground station A via RF communications 258. As the aircraft crosses the dashed terrain boundary 230, it becomes obstructed from line-of-sight communication by the mountain range 238. Based on a flight plan augmented using the DYNAMICS modeling tool, SURFER has calculated the failover locations, marked with circles 240, 244 in FIG. 2A and circles 280, 284 in FIG. 2B. Before crossing the marker, SURFER automatically reroutes FSO communications 250, 254 between B and C. After crossing the marker (FIG. 2B), the aircraft 270 is still networked with all nodes via RF communications 290, 294, 298, and has suffered no failover timeouts.

FIG. 3 is a schematic diagram 300 showing an embodiment of SURFER employing packet erasure coding. SURFER uses packet erasure coding, a forward error correction (FEC) technique, to reduce bit error rate of the overall network. SURFER's deployment of packet erasure coding takes advantage of the exceptionally high base throughput of FSO network links. FEC data is striped across multiple packets 310 in RF communications. Due to the forward error correction, SURFER is resilient to temporary losses in FSO communication 320. A subset of received packets 330 is enough to recover the complete data 340, even with the transient packet loss characteristic of optical links. Additionally, FEC data can be striped across packets on multiple links, further increasing resilience to link degradation or loss. In the use example of FIGS. 2A, 2B, FEC data can reduce the impact of unexpected degradation of the RF links, for example due to terrain obstruction.

Figure 4:
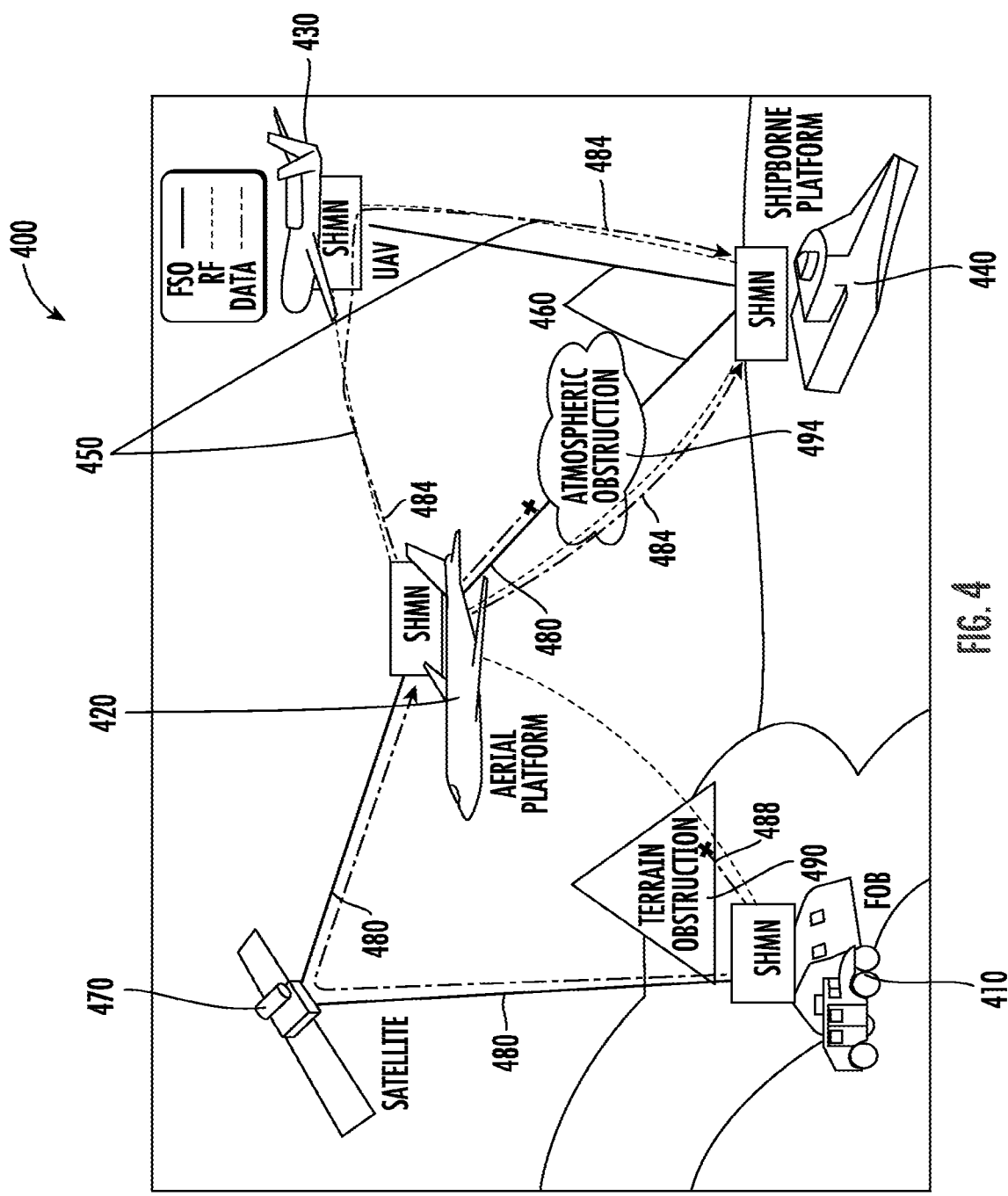
FIG. 4 illustrates RF and FSO communications between four aerial communication platforms in which the SURFER-enabled system has been installed, according to an exemplary embodiment.

In an exemplary use embodiment 400 shown in FIG. 4, a SURFER modem integration solution is installed on four aerial network platforms: a Forward Operating Base (FOB) 410, an Aerial platform 420, a unmanned aerial vehicle (UAV) platform 430, and a Ship-borne platform 440. In the present disclosure, Forward Operating Base (FOB) 410 is also called a ground station, and Aerial platform 420 is also called an aircraft. Data flow between nodes of the aerial network might occur over high capacity FSO links 460 or lower-bandwidth RF links 450. An example of high data-rate flow is shown at the FSO communication path (large-dash lines) 480 between FOB 410 and Ship-borne platform 440, and examples of lower bandwidth data flow are shown at the RF communication paths (small-dash lines) 484.

In the scenario 400, as the Aerial platform 420 crosses a terrain obstruction 490, SURFER automatically redirects the data from the obstructed RF link 488 between FOB 410 and Aerial platform 420 to data flow 480 at the FSO links between FOB 410 and Aerial platform 420 via satellite 470. FEC data on both links between the FOB 410 and Aerial platform 420 mitigate the number of packets lost entirely, thus reducing failover effects.

In the scenario 400, the Aerial platform 420 has temporarily lost FSO communication 480 with the Ship-borne platform 440 due to an atmospheric obstruction 494. As RF links 450 between the two nodes are still connected, SURFER rebalances the traffic to utilize the lower-bandwidth RF links. In an embodiment, FEC data reduce data loss while SURFER redirects the flow. In an embodiment, the higher data-rate flow 480 is too large for a single RF network link 450, and SURFER rebalances the data between two available RF paths. The available RF paths include data flow 484 at the direct RF link between the Aerial platform 420 and Ship-borne platform 440, and data flow 484 at the RF link between the Aerial platform 420 and Ship-borne platform 440 via the UAV platform 430.

Example: In an exemplary embodiment, an aerial vehicle equipped with SURFER-enabled RF and FSO is capable of planning measures taken against anticipated enemy actions such as electronic warfare (EW) jamming and signal tracking. An aerial vehicle equipped with SURFER-enabled RF and FSO communications would, when about to enter a known RF-contested environment, automatically and preemptively reroute data over alternate FSO network links.

Figure 5:
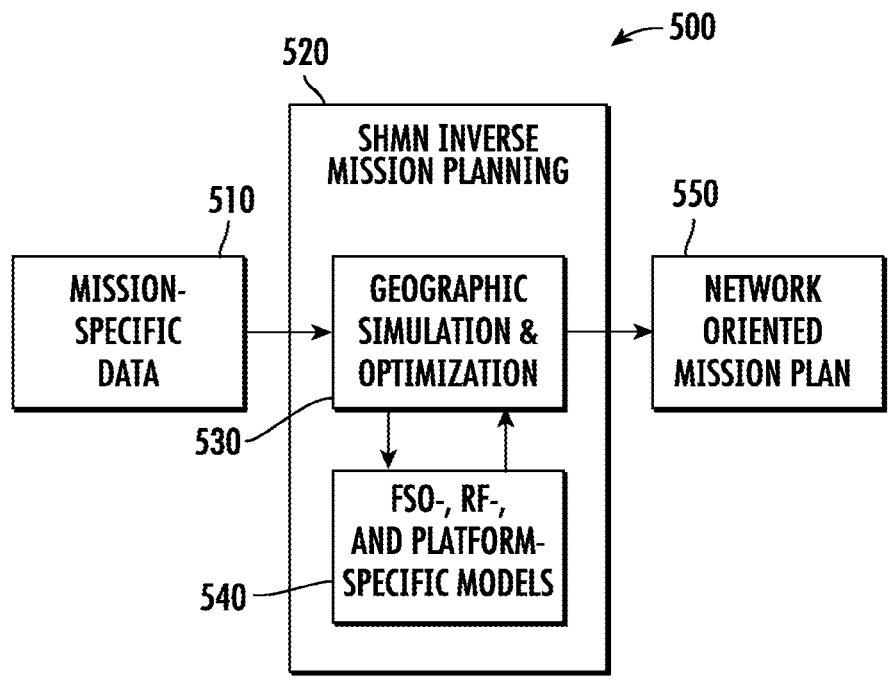
FIG. 5 illustrates an inverse mission planning system for generating network-oriented flight plans for use in a system for RF and FSO communications, according to an embodiment.

Example: As shown in the schematic diagram of FIG. 5, applicant adapted ATCorp's DYNAMICS mission planning tool to create an inverse mission planning system 500 for generating network-oriented flight plans based on the FSO- and RF-enabled overlay network of SURFER. In the SURFER mission planning system 500, DYNAMICS models are redesigned for predictive load balancing in FSO and RF communications systems. System 500 automatically creates network-oriented flight plans 550 using an inverse mission plan modeling component 520 based on user inputs of mission-specific data 510 to modeling component 520. In various embodiments of modeling module 520, DYNAMICS models are redesigned for predictive load balancing in FSO and RF communications systems.

Based on mission-specific data input 510 to inverse planning modeling module 520, modeling module 520 performs a Geographic Search/Simulation/Optimization 530 of network node locations, flight route paths of aircraft and other platforms, and other geographic factors to develop a network-oriented mission plan 550. In various embodiments, mission-specific data 510 include locations of FSO and Radio subscriber nodes, terrain, weather (e.g., atmospheric conditions and obstructions), and other mission-specific data 510. In an embodiment, mission-specific data for overlay network subscriber nodes includes, e.g., airborne, maritime, and ground-based radio nodes and their configurations, including FSO and RF communications, among others. In an embodiment, Geographic Search/Simulation/Optimization 530 defines network node locations and other geographic factors within a battlespace volume. In the present disclosure, the battlespace volume is sometimes called the mission geographic area.

In an embodiment, mission-specific data 510 includes a flight plan/orbit template for flight paths selected by the users. In various embodiments, the flight path template included simple circular orbits of user-selected center position and radius, racetrack, figure-eight, and 6-waypoint orbits. In various embodiments, Geographic Search/Simulation/Optimization 530 determines the characteristic of airborne and surface-based radios in subscriber network nodes at any time throughout the mission geographic area. In various embodiments, Geographic Search/Simulation/Optimization 530 employs a heuristic 3D/4D simulation and optimization algorithm.

The modeling module 520 incorporates behavior models 540 for a diverse set of military radios including FSO and RF communications. In an embodiment, behavioral models for military radios facilitate geographic modeling for a particular pair of military radios via connectivity functions at specified three dimensional locations $(x_1, y_1, z_1)$, $(x_2, y_2, z_2)$ at a time t. In an embodiment, modeled characteristics for digital radios included Bandwidth, Latency, and Loss. Modeled characteristics for analog radios included Signal Strength, Gain, and/or S/N ratio. In an embodiment, in updates to the DYNAMICS system the SURFER inverse mission planning system 500 included additional FSO-specific coverage parameters, such as minimum duration of connectivity and degradation characteristics. In addition, behavior models 540 include platform-specific behaviors for a variety of aerial communication platforms.

In an embodiment, the inverse mission planning system 500 is configured to output a pre-planned mission plan file 550 including predictive traffic load balancing of FSO communications and other radio communications within the mission geographic area. In an embodiment, in addition to being able to "pre-plan" missions, mission planning system 500 is capable of reacting in real time to updates to the mission-specific data 510 during the course of a pre-planned mission. Mission planning system 500 can output a "re-planned" mission plan file 550 based on changes within the mission geographic area.

Example: In an embodiment, the SURFER's mission planning system includes multi-radio support, enabling complete analysis of flight-time RF and FSO interactions. SURFER incorporated advanced radio technologies including a High Capacity Backbone (HCB) with network management features. Mission Oriented Network Visibility presents the network operator with a graphical, geo-mapped picture of the HCB where traffic of interest is automatically tagged with mission relevant labels to provide the operator with improved situational awareness. Mission Optimized Network Operations automatically performs QoS-aware and mission informed load balancing and admission control of network traffic. Mission Responsive Network Control provides system-mediated in-mission reconfiguration of network elements such as radios and routers in response to high-level mission-centric network directives issued by the operator or external network events such as link impairments.

Figure 6:
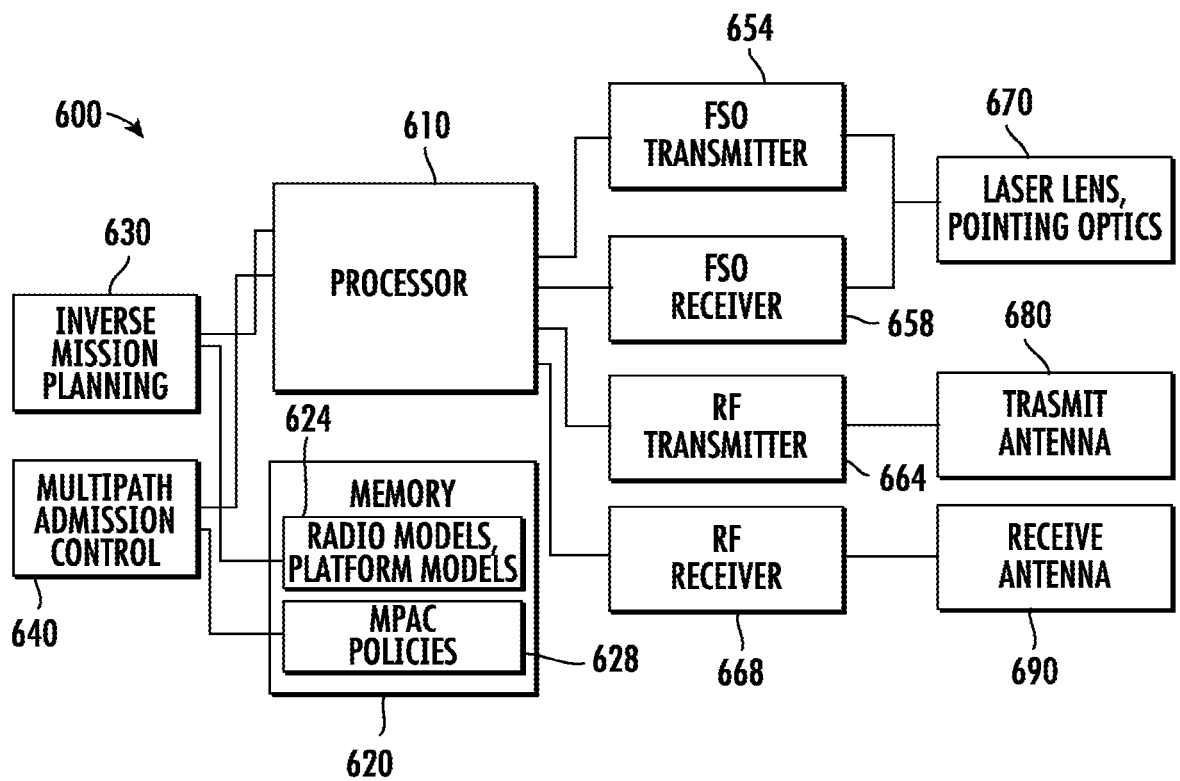
FIG. 6 is a system schematic diagram of a system for RF and FSO communications, according to an exemplary embodiment

Example: As shown in the system schematic diagram of FIG. 6, applicant implemented a system 600 based upon the SURFER requirements of Table 1 through hardware for FSO communication, RF communication, and computer controlled networking. SURFER processor 610 modulated data signals for FSO communications via FSO transmitter 654 and optics 670, and demodulated FSO signals received via FSO receiver 658 and optics 670. SURFER processor 610 modulated data signals for RF communications via RF transmitter 664 and transmit antenna 680, and demodulated RF signals received via RF receiver 668 and receive antenna 690.

In an embodiment, system 600 incorporated a CRR-1000 VPN Gateway Router supplied by Architecture Technology Corporation, Minneapolis, MN. CRR-1000 is a product family of NIAP/CSfC certified routers. In an embodiment, kernel-based IP routing was employed to avoid modulation/demodulation overhead. In an embodiment, a high speed system 600 was capable of up to 10 Gbps throughput on IP-enabled links.

System 600 included network interfaces capable of simultaneous transmission of FSO signals and RF signals. In an embodiment, network interfaces included data packet transmissions via fiber linked to FSO transmitter 654 and FSO receiver 658. In an embodiment, network interfaces included an Ethernet interface linked to RF transmitter 664 and RF receiver 668. In an embodiment, network interfaces included a universal serial bus (USB) connection linked to RF transmitter 664 and RF receiver 668.

System 600 implemented predictive traffic load balancing via Inverse Mission Planning component 630 in conjunction with radio models and platform models 624 stored in memory 620. Processor 610 implemented policy-based multipath admission control (MPAC) via Multipath Admission Control component 640 in conjunction with MPAC policies data 628 stored in memory 620. In an embodiment, system 600 implemented packet erasure coding (FEC) of modulated data signals to address a requirement for resiliency, including a low bit error rate.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A network system comprising:
   a free space optical (FSO) transmitter configured to transmit and direct optical signals through free space;
   an FSO receiver configured to receive the optical signals; and
   a processor configured to modulate data signals and provide modulated data signals for transmission to the FSO transmitter and to a second transmitter configured to transmit electromagnetic signals, wherein the processor is configured to demodulate the received optical signals and to demodulate electromagnetic signals received by a second receiver,
   wherein the processor is configured to define a first point-to-point connection and a second point-to-point connection to communicatively couple a plurality of aerial communications platforms within a geographic area represented by a virtual geographic area defined by the processor,
   wherein the processor is further configured to determine a network resource of each of multiple paths for point-to-point connections for line-of-sight communications available in a network using a terrain defined by the virtual geographic area for the geographic area, before a point-to-point connection is established to a given path identified based on the network resource of the given path for the line-of-sight communication.

2. The network system according to claim 1, wherein the processor is further configured for policy-based multipath admission capable of simultaneous transmission of the optical signals and the electromagnetic signals in combination with policy-based routing (PBR) to check among the multiple paths available in the network before the point-to-point connection is established to the given path.

3. The network system according to claim 1, wherein the processor is further configured to redirect flow of one or both of transmitted optical signals and transmitted electromagnetic signals to reduce or prevent transmission loss.

4. The network system according to claim 1, wherein the processor is further configured for predictive traffic load balancing of one or both of transmitted optical signals and transmitted electromagnetic signals.

5. The network system according to claim 1, wherein the processor is further configured for policy-based multipath admission of requests for access to an IP-routing enabled overlay network.

6. The network system according to claim 1, wherein the electromagnetic signals are radio frequency (RF) signals, wherein the processor is configured to determine a geofenced area of likely connectivity of the optical signals and the RF signals.

7. The network system according to claim 1, wherein the plurality of aerial communications platforms are selected from the group consisting of an aircraft, an unmanned aerial vehicle, a ground station, and a ship-borne platform.

8. The network system according to claim 7, wherein at least one of the plurality of aerial communications platforms comprises an aircraft following a pre-planned flight path within a geographic area.

9. The network system according to claim 1, wherein the virtual geographic area comprises a mission geographic area, wherein the processor further comprises an inverse mission planning system for predictive traffic load balancing of one or both transmitted optical signals and transmitted electromagnetic signals within the mission geographic area.

10. The network system according to claim 9, wherein the inverse mission planning system comprises a radio-behavior model including one or more of terrain effects on the transmitted optical signals and the transmitted electromagnetic signals, and weather effects on the transmitted optical signals and the transmitted electromagnetic signals.

11. The network system according to claim 9, wherein the inverse mission planning system comprises an aerial platform model including characteristics of optical signal and electromagnetic signal subscriber nodes.

12. The network system according to claim 1, wherein the processor is further configured to effect forward error correction (FEC) coding of one or both of transmitted optical signals and transmitted electromagnetic signals.

13. A network system comprising:
   a first transceiver configured to transmit and receive free space optical (FSO) signals via an optics assembly;
   a second transceiver configured to transmit and receive radio frequency (RF) electromagnetic signals via an antenna; and
   a processor configured to provide modulated data signals to the first and second transceivers for transmission and to receive demodulated signals from the first and second transceivers,
   wherein the processor is configured to define a first point-to-point connection and a second point-to-point connection to communicatively couple a plurality of aerial communications platforms within a geographic area represented by a virtual geographic area defined by the processor, wherein the processor is further configured to determine a network resource of each of multiple paths for point-to-point connections for line-of-sight communications available in a network using a terrain defined by the virtual geographic area for the geographic area, before a point-to-point connection is established to a given path identified based on the network resource of the given path for the line-of-sight communication.

14. The network system according to claim 13, wherein the processor is further configured for policy-based multipath admission capable of simultaneous transmission of the FSO signals and the RF electromagnetic signals in combination with policy-based routing (PBR) to check among the multiple paths available in the network before the point-to-point connection is established to the given path.

15. The network system according to claim 13, wherein the processor is further configured to redirect flow of one or both of transmitted FSO signals and transmitted RF electromagnetic signals to reduce or prevent transmission loss.

16. The network system according to claim 13, wherein the processor is further configured for predictive traffic load balancing of one or both of transmitted FSO signals and transmitted RF electromagnetic signals.

17. The network system according to claim 13, wherein the plurality of aerial communications platforms are selected from the group consisting of an aircraft, an unmanned aerial vehicle, a ground station, and a ship-borne platform.

18. The network system according to claim 13, wherein the virtual geographic area comprises a mission geographic area, wherein the processor further comprises an inverse mission planning system for predictive traffic load balancing of one or both transmitted FSO signals and transmitted RF electromagnetic signals within the mission geographic area.

19. The network system according to claim 18, wherein the inverse mission planning system comprises a radio-behavior model including one or more of terrain effects on the transmitted FSO signals and the transmitted RF electromagnetic signals, and weather effects on the transmitted FSO signals and the transmitted RF electromagnetic signals.

20. The network system according to claim 13, wherein the processor is further configured to effect forward error correction (FEC) coding of one or both of transmitted FSO signals and transmitted RF electromagnetic signals.

* * * * *